United States Patent Office 3,312,632
Patented Apr. 4, 1967

3,312,632
METHOD FOR MAKING METAL OXIDE
MICROSPHERES
Jean G. Smith, Baltimore, Md., assignor to W. R. Grace & Co., New York, N.Y., a corporation of Connecticut
No Drawing. Filed Apr. 21, 1965, Ser. No. 449,867
20 Claims. (Cl. 252—301.1)

This invention relates to a process for producing highly uniform metal oxide microspheres.

In summary, the process of this invention is a method for forming microspheres of metal oxides comprising mixing an ammonia-releasing agent with an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, said aquasol containing from 0 up to saturation quantities of dissolved salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof, and from 0 to 5 moles of colloidal carbon per mole of metal in the mixture; introducing the mixture in the form of droplets in a dehydrating solvent having a temperature sufficiently high to cause substantial decomposition of the ammonia-releasing agent; and recovering partially dehydrated microspheres from the dehydrating solvent.

In the process of this invention, the preferred ammonia-releasing agents are selected from the group consisting of hexamethylenetetramine, acetamide, ammonium carbamate, ammonium cyanate, urea, and mixtures thereof. The total metal compound concentration of the aquasol, expressed as the metal oxide, can be within the range of from one to 500 grams per liter and is preferably within the range of from 50 to 150 grams per liter. The concentration of the dissolved metal salts in the aquasol is preferably from 0.1 g./l. up to less than a flocculating quantity. The ammonia-releasing agent is mixed with the aquasol in a quantity sufficient to form a metal oxide gel from the metal compounds present in the aquasol. When the metal oxide aquasol is substantially free from dissolved metal salts, the quantity of the ammonia releasing agent employed is sufficient to adjust the pH of the aquasol to from 1.0 to 0.1 pH units below the gelation pH of the sol. When the aquasol contains substantial quantities of dissolved metal salts, the quantity of ammonia-releasing agent employed is sufficient to provide from 70 to 300 percent of the stoichiometric quantity of ammonia required to precipitate the metal salts.

Dense microspheres of actinide oxides alone or in combination with other metal oxides and/or carbon, in the size range of from 50 to 400 microns are important for manufacturing fuel elements for high temperature nuclear reactors of which the gas-cooler reactors are an example. Each microsphere consists of two parts, a core and a coating. The core is the portion containing the actinide oxide, either alone or in solid solution with another oxide. Alternatively, the core can be an actinide carbide which can be formed from mixtures of actinide oxides and carbon. The core must have good sphericity, strength, and high density. An impervious coating of a refractory metal oxide or pyrolytic carbon is applied to the core to insure fission product retention. The coated microspheres are then dispersed in a matrix material and fabricated into fuel elements.

The general process for the production of microspheres by solvent dehydration of aquasol droplets has been previously disclosed. In the previously disclosed process, the sol droplets were injected into a dehydrating solvent and recovered from the solvent in a dehydrated form. Since a large volumetric proportion of the droplet, as water, was removed in the process, the size of the droplet was greatly diminished during the dehydration. The microspheres formed by this process were often found to be pitted, cracked, and to contain internal voids. By carefully controlling the process, the proportion of defective spheres could be lowered. However, the requisite control was extremely difficult, and the process still produced a significant proportion of defective microspheres.

In the previously disclosed processes for the production of microspheres by solvent dehydration, the feed was limited to metal oxide aquasols. Metal salts incidentally present in the aquasols remained in the soluble form in the microspheres. Hence, only very small concentrations of soluble metal salts could be tolerated in the aquasols from which the microspheres were made, and elaborate procedures were required to prevent loss of metal ions from the dehydrated microspheres. Aquasols containing significant proportions of soluble metal salts were entirely unsuitable for use as feed materials for previous solvent dehydration microsphere processes.

It is an object of this invention to provide a process for making microspheres having an improved uniformity of surface and density from metal oxide aquasols.

It is another object of this invention to provide a process for making metal oxide microspheres from metal oxide aquasols containing dissolved metal salts.

It is an object of this invention to make microspheres having a uniform surface and density from metal oxide aquasols and mixtures thereof with colloidal carbon by solvent dehydration of the respective droplets.

It is another object of this invention to make microsphere cores containing metal oxides selected from the group consisting of uranium dioxide, uranium trioxide, thorium dioxide, plutonium dioxide, plutonium trioxide, zirconium dioxide, beryllium oxide, yttrium oxide, and mixtures thereof, from which dense microspheres can be prepared.

It is still another object of this invention to make microsphere cores containing mixtures of colloidal carbon and metal oxides selected from the group consisting of uranium dioxide, uranium trioxide, thorium dioxide, plutonium dioxide, plutonium trioxide, zirconium dioxide, beryllium oxide, yttrium oxide, and mixtures thereof from which dense metal carbide microspheres can be prepared.

The metal compounds which are desirable in nuclear reactor fuel elements include uranium dioxide, uranium trioxide, thorium dioxide, plutonium dioxide, plutonium trioxide, diluent oxides such as zirconium dioxide, yttrium oxide, and beryllium oxide, and the respective carbides of the metal oxides. In the process of this invention microspheres containing these oxides are formed by the general technique of mixing an ammonia-releasing agent with an aquasol of a metal oxide desired in the product microsphere, introducing the mixture in the form of droplets into a dehydrating solvent having a temperature which is sufficiently high to cause substantial ammonia release from the ammonia-releasing agent, and recovering microspheres from the dehydrating solvent which have undergone at least partial dehydration.

Metal oxide aquasols which are suitable for use as feed materials in the process of this invention are well known in the art. When aquasols which are substantially free from soluble metal salts are employed as the feed in the process of this invention, a high quality microsphere product is formed which is far superior to those formed by previously known processes. Furthermore, this high quality product can be formed over a much wider range of operating conditions, thus simplifying the process control requirements of the process.

The process of this invention is also suitable for forming metal oxide microspheres from metal oxide aquasols containing substantial portions of dissolved metal salts. The dissolved metal salts which can be present in the aquasol feed correspond to the metal oxides desired in the product microspheres and include salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof. The anion portion of the salt can be any anion providing a water-soluble salt. Examples of suitable metal salts include the metal chlorides, bromides, nitrates, sulfates, formates, and acetates. Monovalent anions are preferred, but anions having higher valences can be used.

Some metal oxide aquasols contain dissolved metal salts because of the method by which they were produced. For example, an uranium dioxide-zirconium dioxide aquasol has been produced by peptizing a hydrous uranium dioxide precipitate with a zirconyl salt, and the aquasol product contained zirconyl salts in solution and absorbed at the surface of the uranium dioxide micelles. Similar aquasols have been formed by peptizing a metal oxide with a salt of the same metal. The process of this invention provides a method for forming high quality microspheres from such aquasols.

The formation of microspheres from aquasols which have been mixed with metal salt solutions to provide an aquasol containing metal salts in solution is made possible by the process of this invention. Microspheres containing a uniform mixture of metal oxides can be produced from aquasol feeds comprising oxide sol particles of one metal and dissolved salts of the same or a different metal by this process.

The concentration of the metal compounds in the aquasol feed can vary over a wide range. The total concentration of metal compounds in the aquasol feed, expressed as the metal oxide, can be within the range of from one to 500 grams per liter, and is preferably within the range of from about 50 to 150 grams per liter. The aquasols can contain from 0 up to saturation quantities of the dissolved metal salts. An aquasol is defined as containing "saturation quantities" of soluble metal salts when the liquid phase is saturated with the soluble metal salts. Quantities of dissolved metal salts greater than 0.1 gram per liter can be present in the aquasols. Preferably the dissolved metal salts are present in quantities which are insufficient to flocculate the sol particles, but flocculating quantities of the dissolved metal salts can be employed in the feed. The term, metal oxide aquasols, is employed herein as including metal oxide aquasols which contain dissolved metal salts in quantities sufficient to flocculate the sol particles in addition to aquasols which contain no dissolved metal salts or less than flocculating quantities of dissolved metal salts. By varying the solution concentration and the size of the droplets introduced into the dehydrating solvent, it is possible to obtain microspheres upon dehydration which have a wide range of sizes.

The production of metal carbide microspheres for use in nuclear reactor fuel construction has recently become very important. These microspheres can be produced from microspheres containing a mixture of metal oxide and colloidal carbon. The process of this invention can be employed to produce microspheres containing an extremely intimate, uniform metal oxide-carbon mixture from metal oxide aquasols containing dispersed colloidal carbon. The metal oxide and carbon aquasol can be made by several simple techniques. Fine-sized carbons such as Mogul and Regal SRF-S produced by Cabot Corporation are suitable. Carbon dispersion in the aquasols can be easily obtained by adding the carbon to the aquasol or solution to be mixed with the aquasol and dispersing the carbon with an ultrasonic probe. Alternatively, the carbon can be dispersed in water containing a dispersing agent by use of an ultrasonic probe or a high shear mixer, and the carbon suspension can be added to the aquasol or a metal salt solution to be mixed with the aquasol. The particular techniques employed for obtaining the carbon dispersion in the aquasol is not critical. The quantity of carbon dispersed in the aquasol can range from 0 to 5 moles of carbon per mole of metal in the mixture.

The ammonia-releasing agents employed in the process of this invention are, in general, compounds which when heated above room temperature provide a substantial release of ammonia by thermal decomposition but which are relatively stable at ambient or room temperatures. Because of their low rate of reaction and ammonia release at ambient temperatures, these compounds can be added to the metal oxide aquasols at room temperature without causing an immediate reaction. When the aquasol droplets are heated by contact with the dehydration solvent, these compounds decompose rapidly to release ammonia. The ammonia reacts with the metal compounds present in the aquasols to form a metal oxide gel within the droplets. Examples of suitable ammonia-releasing agents are hexamethylenetetramine, acetamide, ammonium carbamate, ammonium cyanate, urea, and mixtures thereof. The ammonia-releasing agent is preferably added to the aquasol just prior to the introduction of the feed materials into the dehydrating solvent. However, the ammonia-releasing agent can be mixed with the aquasol feed several hours before use if the mixture is maintained at a low temperature until just prior to use.

The quantity of ammonia-releasing agent mixed with the aquasol feeds is sufficient to form a metal oxide gel from the metal compounds present in the sol droplets when they are contacted with the dehydrating solvent. The quantity of ammonia-releasing agent mixed with the sol feed is at least sufficient to provide about 70 percent of the stoichiometric quantity of ammonia required to precipitate the metal salts in the feed or to adjust the pH of the feed to one pH unit below the gelation pH of the sol, whichever is lower, and is insufficient to raise the pH of the feed above about 0.1 pH units below the gelation pH of the sol. The term "sol" in this context is defined as including aquasols with or without substantial quantities of dissolved metal salts therein, that is, "sol" denotes the total feed used in the process of this invention. Metal oxide aquasols which are substantially free from dissolved metal salts can be mixed with a quantity of the ammonia-releasing agent sufficient to adjust the pH of the feed to from 1.0 to 0.1 and preferably from about 0.8 to 0.4 pH units below the gelation pH of the sol. The gelation pH of an aquasol feed is defined as the pH which will effect gelation of the sol within 15 minutes after the adjustment of the sol to this pH is made. When the aquasol feed contains substantial quantities of dissolved metal salts, the quantity of ammonia-releasing agent employed is sufficient to provide from 70 to 300 percent and preferably from 100 to 150 percent of the stoichiometric quantity of ammonia required to precipitate the metal salts in the feed.

The microspheres are formed from the metal oxide and metal oxide-carbon aquasols containing the ammonia-releasing agent using a hot solvent column system such as disclosed in applications Ser. No. 364,930 and Ser. No. 364,931, filed May 5, 1964. In this system, the aquasol droplets are introduced into the top of a countercurrently flowing stream of hot dehydrating solvent passing up through a tall column. The hot solvent heats the droplets and effects decomposition of the ammonia-releasing agent, and the released ammonia reacts with the metal oxide sol particles and, if present, the dissolved metal salts to form the corresponding oxide gel in the aqueous droplets. As the droplets fall through the column, they are dehydrated, and the dehydrated microspheres are collected from the bottom of the column. The microspheres are continuously removed, separated from the solvent, and are further dried before sintering.

The hot column solvent apparatus comprises a tall column with a conical bottom into which the microspheres settle. The dehydrating solvent is introduced into the bottom of the column and is removed at the top thereof. The sol feed can be introduced into the top of the column to form droplets by several techniques. For example, a small tube or needle having an inner diameter within the range of from 0.15 to 0.6 millimeter can be used to introduce the sol feed into the solvent to produce the preferred particles. Preferably the needle is surrounded by a larger capillary tube through which solvent is passed, and the sol is introduced concurrently with this stream of solvent. As an alternate technique, the sol feed can be dispersed in a suitable solvent to form an emulsion containing droplets having uniform size, and the emulsion can be introduced into the column through an appropriate inlet. The dehydrated microspheres are removed from the conical collecting section at the bottom of the column.

In the hot column technique, the solvent can be reconditioned by circulation to a distillation pot for water removal. The distillation pot serves as a solvent reservoir for the system and can be controlled by adjusting the rate of water removal and distillation temperature to provide a solvent having the desired water content. A water cooler can be placed on the solvent inlet line for adjustment of the solvent temperature to the desired value. This process has the advantage of providing a wide range of column conditions.

One embodiment of the equipment useful for the process comprises a column 70 inches in length and 3 inches in diameter with a conical bottom for collecting the settling microspheres. The solvent is pumped into the column 4 inches from the bottom and is removed from the column 4 inches from the top.

Choice of solvents for this system is very important. The solvents giving the best results are the higher alcohols which have the desired solubility for water. The solvents must be inert, free of objectionable physical properties such as emulsifying tendencies, for example, must have a density low enough to permit settling of the microspheres, and must be capable of being heated to a temperature which is sufficiently high to cause decomposition of the ammonia-releasing agent to release ammonia in the aqueous droplets introduced into this system The solvents selected must have saturation concentrations with water within a certain range permitting adjustment of drying conditions. Solvents with solubilities for water of from about 1 to 30 percent has provided satisfactory results. Examples of preferred solvents include hexanol, ethyl-hexanol, and ethyl-butanol. Solvents with water solubilities which are too high may be recirculated from the distillation pot still retaining a predetermined amount of water whereby the effective water solubility is diminished. For example, butanol, which has a hot solubility for water of about 28 weight percent, is nearly saturated with water when introduced into the column. In contrast, ethyl-hexanol, which has a 4 to 6 weight percent hot solubility for water, is circulated to the column in nearly anhydrous form. Hexanol, with a 10 to 11 weight percent hot solubility for water is used with a water content of 3 to 6 percent.

The temperature of the dehydrating solvent entering the column generally ranges from about 60 to 120° C. while that leaving from the top of the column is generally from about 10 to 40° C. cooler. Such temperatures are ideal for releasing ammonia within the aquasol droplets with most of the ammonia-releasing agents. Higher solvent temperatures may be employed with ammonia releasing agents such as urea.

The aquasol droplets are dried to a final water content of less than 50 percent and preferably less than 25 percent in the column. The partially dehydrated product microspheres containe unreacted precipitating agent plus ammonium salts and other neutralization products. These must be removed prior to sintering. Therefore, the microspheres are treated with ammonia to fix the oxide components, then washed with water, and finally dried by heating in a stream of inert gas or in a vacuum. Preferably, the microspheres are gradually heated from 40° C. up to 110° C. during drying. The resulting microspheres are then ready for sintering.

Very important advances in the production of materials from which fuel elements for nuclear reactors can be fabricated are provided by the process of this invention. Previously, hexamethylenetetramine had been employed in an attempt to produce thorium oxide gels from thorium nitrate These attempts were abandoned when it was determined that the gels produced reverted to sols on standing for several hours. In other previous work, hexamethylenetetramine had been mixed with thorium oxide aquasols to form gel beads. This previous process is subject to a number of serious difficulties which are eliminated in the process of this invention. In the previous process, the gel beads produced where not dehydrated and were structurally weak, creating serious handling problems. Dehydration was obtained only after the beads were formed, removed, and placed in a separate apparatus. Finally, the previous process did not provide the uniform size and surface, and high density of the microspheres formed by the process of this invention.

The process of this invention is a simple, direct process. Because the hydrolysis rates of the ammonia-releasing agents increase with temperature, the agent may be dissolved in the aquasol at room temperature where the hydrolysis rate is quite slow and not cause precipitation. When aquasols containing the precipitation agent are exposed to the higher temperatures of the dehydrating solvent, the rate of ammonia release is vastly accelerated and the hydrous oxide is precipitated within the droplet. The dehydrating solvent gradually extracts water from the precipitated droplets until substantially dry microspheres are obtained.

This invention is further illustrated by the following specific but non-limiting examples.

*Example I*

This example shows the preparation of thorium dioxide microspheres by the process of this invention.

A thorium dioxide sol containing 15.5 wt. percent thorium dioxide was prepared by precipitating hydrous thorium dioxide with ammonia, washing the precipitate with aqueous ammonia followed by a water wash to remove electrolytes, adding nitric acid to the precipitate to lower the pH, and finally heating the precipitate to about 100° C. to form a sol. A 4.0 g. portion of hexamethylenetetramine was added with rapid stirring to 190 ml. of this sol. The pH of the mixture was 4.0.

The hexamethylenetetramine-treated sol was formed into droplets by injecting it through a 23-gauge hypodermic needle surrounded by a 2.8 mm. capillary through which a concurrent flow of hexanol was maintained. The solution was injected into the top of a 7 ft. column through which hexanol was pumped countercurrently. The column conditions were as follows.

Sol injection rate, ml./min. _____ 2.6
Solvent flow rate, ml./min.:
    To needle _____ 110
    To column _____ 690
Solvent temperature, ° C.:
    To needle _____ 28
    To column _____ 100
    From column _____ 74
    In distillation pot _____ 110

The product microspheres collected from the bottom of the column were soaked in a concentrated aqueous ammonium hydroxide solution for about 15 minutes, were washed with water until free from electrolytes, and were dried.

The product particles were smooth microspheres having a size of from 150 to 250 microns. Microspheres prepared from the same sol without hexamethylenetetramine under similar conditions were irregular in shape, deeply cratered, and were frequently fractured. The addition of hexamethylenetetramine to the sol feed improved the sphericity of the particles and substantially reduced cratering and fracture.

*Example II*

This example describes the preparation of uranium dioxide microspheres by the process of this invention.

A uranium dioxide sol was prepared by electroreduction of a uranyl chloride solution to the corresponding uranous salt followed by electrodialysis to remove chloride ions. The temperature of the system during both operations was 40° C. The final sol product had an equilibrium pH of 2.5 and a specific conductance of $3.2 \times 10^{-3}$ mho/cm. The uranium dioxide micelles had a size of 10 mm. as determined by electron microscopy. The sol concentration was 95.8 g. of $UO_2$ per liter of sol.

A portion of this sol was injected into the column described in Example I without further treatment. The second portion of the sol, however, was mixed with sufficient hexamethylenetetramine to bring the sol pH to 4.4. The hexamethylenetetramine was added to the sol by dissolving 12.0 g. of hexamethylenetetramine in 50 ml. of water and mixing a 50 ml. volume of the sol with the solution.

The two sol samples, with and without hexamethylenetetramine treatment, were put through the column sequentially. The column conditions were identical and were as follows:

Sol injection rate, ml./min _____ 2.7
Solvent flow rate, ml./min.:
    To needle _____ 100
    To column _____ 750
Solvent temperature, ° C.:
    To needle _____ 40
    To column _____ 95
    From column _____ 70
    In distillation pot _____ 108

The microspheres were ammonia treated, washed, and dried as described in Example 1.

Only deeply cratered microspheres were obtained with the sol which had not been treated with hexamethylenetetramine. Using the sol treated with hexamethylenetetramine, the microspheres produced were perfect in every respect. They had a reflective black surface and exhibited no craters or distortions in shape. The microspheres produced in both sols had a size of from 150 to 300 microns.

*Example III*

This example illustrates the preparation of microspheres containing 2 intimately associated oxide components, uranium dioxide and zirconium dioxide, by the process of this invention.

The sol was prepared by coprecipitating the respective hydrous oxides in a $UO_2:ZrO_2$ wt. ratio of 4:1. The coprecipitate was washed free from electrolytes with a dilute ammonia solution and a water wash, and then were peptized to a sol by adding nitric acid to lower the pH and heating the acidified sol at reflux temperatures for one hour. The product sol had a pH of 1.5 and a specific conductance of $3.0 \times 10^{-2}$ mho/cm. The micelle size of the sol averaged 10 millimicrons.

A portion of the sol was treated with 1.5 g. of hexamethylenetetramine crystals. This quantity of hexamethylenetetramine adjusted the sol pH to 4.1. Another portion of the sol was not treated with hexamethylenetetramine.

The sol samples, with and without hexamethylene treatment, were delivered to the column under the conditions given below:

Sol injection rate, ml./min. _____ 2.0
Solvent flow rate, ml./min.:
    To needle _____ 85
    To column _____ 700
Solvent temperature, ° C.:
    To needle _____ 30
    To column _____ 100
    From column _____ 75
    In distillation pot _____ 110

The microspheres were ammonia treated, washed, and dried as described in Example I. The microspheres made from the sol which had been treated with hexamethylenetetramine had a black reflective surface and were free from all defects. The product obtained from the sol which had not been treated with hexamethylenetetramine were deeply cratered spheres, many of which were also fractured and spalled. The microspheres produced from each of these sols had a size of from 100 to 250 microns.

*Example IV*

This example shows the preparation of uranium dioxide-carbon microspheres by the process of this invention. These microspheres can be converted to uranium dicarbide by sintering.

The feed material in this example was a uranium dioxide-carbon aquasol having a carbon to uranium metal mole ratio of 4.4:1. The uranium dioxide sol employed to form the feed was the same material described in Example II. This sol contained 95.8 g. of $UO_2$ per liter of sol. The colloidal carbon dispersion from which the feed was made was obtained by dispersing Regal SRF-S colloidal carbon black in a 0.019 N ammonia solution containing a dispersant. The dispersant employed was Daxad 11, a sodium salt of a polymerized alkylnapthalene sulfonic acid, obtained from W. R. Grace & Co. The carbon dispersion had a concentration of 9.76 wt. percent carbon. The colloidal carbon black employed comprised spherical particles having an average size of about 55 millimicrons.

The feed was obtained from these materials by admixing 296 ml. of the uranium dioxide sol with 57.2 g. of the aqueous carbon dispersion. The carbon to uranium metal ratio of 4.4 was selected to yield a uranium dicarbide composition after sintering. An excess of carbon is provided because substantial carbon loss occurs during sintering through volatility and reaction with oxygen. The uranium dioxide-carbon sol mixture had a pH of 2.6 and a specific conductance of $2.8 \times 10^{-3}$ mho/cm.

A portion of this sol mixture was not treated with hexamethylenetetramine. A portion of the mixture was mixed with a sufficient quantity of a hexamethylene tetramine solution to provide a final pH of 4.0. The hexamethylenetetramine solution was obtained by dissolving 12 g. of hexamethylenetetramine crystals in 50 ml. of water.

The untreated and treated sols were sequentially fed into the column described in Example I under the following column conditions.

Sol injection rate, ml./min. _____ 4.0
Solvent flow rate, ml./min.:
    To needle _____ 100
    To column _____ 750
Solvent temperature, ° C.:
    To needle _____ 40
    To column _____ 95
    From column _____ 74
    In distillation pot _____ 112

The microspheres were ammonia treated, washed, and dried as described in Example I. The microspheres produced with the untreated sol were deeply cratered. However, when the sol which had been treated with hexamethylenetetramine was introduced into the column, the craters completely disappeared. The product microspheres obtained from both sols had a size within the range of from 150 to 300 millimicrons.

Example V

This example shows the preparation of uranium dioxide microspheres from a uranium dioxide aquasol containing dissolved uranous chloride.

The sol feed was obtained by mixing a uranium dioxide sol with a uranous chloride solution. The uranium dioxide sol was obtained by electroreducing a uranyl chloride solution to form a uranous chloride solution, precipitating uranium dioxide from the solution with an aqueous ammonia solution, washing the precipitate free of electrolytes, dispersing the precipitate in water, acidifying the slurry with a 6 N sulfuric solution and heating the acidified uranium dioxide suspension under a nitrogen blanket at 100° C. for one hour.

A 100 ml. volume of the uranium dioxide sol, containing 100 g. of $UO_2$ per liter of suspension, was then mixed with 211 ml. of a uranous chloride solution containing the equivalent of 95 g. $UO_2$ per liter. A saturated solution of hexamethylenetetramine containing a total of 16.1 g. of hexamethylenetetramine was added with strong stirring to this mixture.

Uranium dioxide microspheres were obtained from this sol feed by injecting the sol into the column described in Example 1. The conditions in the column were as follows.

Sol injection rate, ml./min. _____ 2.3
Solvent flow rate, ml./min.:
   To needle _____ 85
   To column _____ 690
Solvent temperature, ° C.:
   To needle _____ 29
   To column _____ 100
   From column _____ 74
   In distillation pot _____ 112

The microspheres were ammonia-treated, washed, and dried as described in Example I. The product articles were perfect black microspehres ranging in size from 115 to 290 microns, clearly showing that the process of this invention can be used to make high quality microspheres from metal oxide aquasols containing substantial quantities of dissolved metal salts.

Example VI

This example shows the preparation of microspheres containing two oxide components in intimate association by the process of this invention. The sol feed employed contained dissolved metal salts due to the technique employed for making the sol.

A uranium dioxide-zirconium dioxide aquasol was prepared by peptizing freshly precipitated hydrous uranium dioxide with a zirconyl nitrate solution. A uranyl chloride was electro-reduced to form a uranous chloride solution. A 1040 ml. volume of the uranous chloride solution, containing the equivalent of 50 g. $UO_2$ per liter, was mixed with an aqueous ammonia solution to form the uranium dioxide precipitate. The hydrous uranium dioxide precipitate was filtered and washed free of electrolytes. The washed precipitate was slurried in water to form a suspension having a volume of 605 ml. A 45 ml. volume of a zirconyl nitrate solution containing the equivalent of 287 g. $ZrO_2$ per liter was added to the uranium dioxide slurry with stirring. The mixture was heated at 100° C. under a nitrogen atmosphere for two hours, and a non-settling black sol was obtained.

A 4.4 g. quantity of hexamethylenetetramine crystals was dissolved in 200 ml. of the above sol with strong agitation. The hexamethylenetetramine raised the sol pH from 1.7 up to 4.0. This sol feed was employed to form the corresponding microspheres as described in Example I. The column conditions employed were as follows:

Sol injection rate, ml./min. _____ 2.8
Solvent flow rate, ml./min.:
   To needle _____ 90
   To column _____ 690
Solvent temperature, ° C.:
   To needle _____ 28
   To column _____ 100
   From column _____ 73
   In distillation pot _____ 108

The microspheres were treated with a concentrated ammonia solution for 15 minutes, were washed with water until free of electrolytes, and were dried as described in Example I.

Perfect microspheres were produced by this process. The microspheres had a black reflective surface and ranged from 100 to 250 microns in size.

Example VII

This example shows the preparation of uranium dioxide-zirconium dioxide microspheres from a sol feed formed by mixing a uranium dioxide aquasol with a zirconyl salt solution.

The uranium dioxide sol was prepared by the procedure described in Example V, except that nitric acid was employed to acidify the uranium dioxide precipitate prior to peptization. A 268 ml. volume of this sol, containing 61 g. of $UO_2$ per liter, was mixed with 118 ml. of a zirconyl nitrate solution containing the equivalent of 287 g. $ZrO_2$ per liter. The $UO_2$:$ZrO_2$ weight ratio in this sol was 3.25:10. A 2.0 quantity of a hexamethylenetetramine solution obtained by dissolving 12 grams of the solid hexamethylenetetramine in 50 ml. of water was added to 100 ml. of the above aquasol, bringing the sol pH to 1.0.

Microspheres were formed from the hexamethylenetetramine-treated aquasol by the procedure described in Example I. The column conditions were as follows.

Sol injection rate, ml./min. _____ 2.5
Solvent flow rate, ml./min.:
   To needle _____ 100
   To column _____ 690
Solvent temperature, ° C.:
   To needle _____ 40
   To column _____ 101
   From column _____ 74
   In distillation pot _____ 111

Perfect black microspheres having an average size of 350 microns were produced by this process. The microspheres were soaked in a concentrated ammonia solution for about 15 minutes, were washed until free of electrolytes, and dried.

Obviously, many modifications and variations of the process of this invention as hereinabove set forth may be made without departing from the essence thereof, and only such limitations should be applied as are indicated in the appended claims.

I claim:

1. A process for forming microspheres containing metal oxides comprising the steps of mixing an ammonia-releasing agent with an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, said aquasol containing from zero up to saturation quantities of dissolved salts of metal cations selected from the group consisting of $U^{+4}$, $(UO_2)^{+2}$, $Th^{+4}$, $Pu^{+4}$ $(PuO_2)^{+2}$, $(ZrO)^{+2}$, $Be^{+2}$, $Y^{+3}$, and mixtures thereof, and from 0 to 5 moles of colloidal carbon per mole of metal in the mixture, the quantity of ammonia releasing agent mixed with the aquasol being at least sufficient to provide 70 percent of the stoichiometric quantity of ammonia required to precipitate the metal salts in the aquasol or to adjust the pH of the aquasol to one pH unit below the gelation pH of the sol, whichever is lower, and being insufficient to raise the pH of the aquasol above 0.1 pH units below the gelation pH of the sol; introducing the mixture in the form of droplets into a dehydrating solvent having a temperature sufficiently high to cause substantial decomposition of the ammonia-releasing agent; and recovering partially dehydrated microspheres from the dehydrating solvent.

2. The process of claim 1 wherein the ammonia-releasing agent is selected from the group consisting of hexamethylenetetramine, acetamide, ammonium carbamate, ammonium cyanate, urea, and mixtures thereof.

3. The process of claim 1 wherein the ammonia-releasing agent is hexamethylenetetramine.

4. The process of claim 1 wherein the dehydrating solvent has a solubility for water of from 1 to 30 wt. percent.

5. The process of claim 1 wherein the microspheres have been dried to a water content of less than 50 wt. percent before they are recovered.

6. The process of claim 1 wherein the total concentration of metal compounds in the aquasol, expressed as the metal oxides, is from 1 to 500 g./l.

7. The process of claim 1 wherein the quantity of ammonia-releasing agent mixed with the aquasol is sufficient to form a metal oxide gel from the metal compounds in the sol droplets when contacted with the dehydrating solvent.

8. A process for forming microspheres containing metal oxides comprising the steps of mixing an ammonia-releasing agent with an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, said aquasol containing from 0 to 5 moles of dispersed colloidal carbon per mole of metal in the mixture and being substantially free from dissolved metal salts, the quantity of ammonia-releasing agent employed being sufficient to adjust the pH of the aquasol to from 1.0 to 0.1 pH units below the gelation pH of the sol; introducing the mixture in the form of droplets into a dehydrating solvent having a temperature sufficiently high to cause substantial decomposition of the ammonia-releasing agent; and recovering partially dehydrated microspheres from the dehydrating solvent.

9. The process of claim 8 wherein the ammonia-releasing agent is selected from the group consisting of hexamethylenetetramine, acetamide, ammonium carbamate, ammonium cyanate, urea and mixtures thereof.

10. The process of claim 8 wherein the ammonia-releasing agent is hexamethylenetetramine.

11. The process of claim 8 wherein the dehydrating solvent has a solubility for water of from 1 to 30 wt. percent.

12. The process of claim 8 wherein the microspheres have been dried to a water content of less than 50 wt. percent before they are recovered.

13. A process for forming microspheres of metal oxides comprising mixing an ammonia-releasing agent with an aquasol of a metal oxide selected from the group consisting of uranium dioxide, uranium trioxide, thorium dioxide, plutonium dioxide, plutonium trioxide, zirconium dioxide, beryllium oxide, yttrium oxide, and mixtures thereof, said aquasol containing from 0.1 g./l. up to saturation quantities of dissolved salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, and mixtures thereof, and from 0 to 5 moles of colloidal carbon per mole of metal in the mixture, the quantity of ammonia-releasing agent employed being sufficient to provide from 70 to 300 percent of the stoichiometric quantity of ammonia required to precipitate the dissolved metal salts; introducing the mixture in the form of droplets into a dehydrating solvent having a temperature sufficiently high to cause substantial decomposition of the ammonia-releasing agent; and recovering partially dehydrated microspheres from the dehydrating solvent.

14. The process of claim 13 wherein the ammonia-releasing agent is selected from the group consisting of hexamethylenetetramine, acetamide, ammonium carbamate, ammonium cyanate, urea, and mixtures thereof.

15. The process of claim 13 wherein the ammonia-releasing agent is hexamethylenetetramine.

16. The process of claim 13 wherein the total concentration of metal compounds in the aquasol, expressed as the metal oxide, is from 1 to 500 g./l.

17. The process of claim 13 wherein the quantity of dissolved metal salts in the aquasol is above 0.1 g./l. and less than the quantity required to flocculate the sol particles.

18. The process of claim 13 wherein the quantity of ammonia-releasing agent employed is sufficient to provide from 100 to 150 percent of the stoichiometric quantity of ammonia required to precipitate the dissolved metal salts.

19. The process of claim 13 wherein the dehydrating solvent has a solubility for water of from 1 to 30 wt. percent.

20. The process of claim 13 wherein the microspheres have been dried to a water content of less than 50 wt. percent before they are recovered.

References Cited by the Examiner

UNITED STATES PATENTS

| | | | |
|---|---|---|---|
| 2,467,089 | 4/1949 | Marisic et al. | 252—317 X |
| 2,900,349 | 8/1959 | Schwartz | 252—317 |
| 3,027,234 | 3/1962 | Michalko | 252—317 X |
| 3,171,715 | 3/1965 | Kleinsteuber. | |

OTHER REFERENCES

AEC Document, TID–11494, 1961, pp. 23–25.

CARL D. QUARFORTH, *Primary Examiner.*

BENJAMIN R. PADGETT, *Examiner.*

S. TRAUB, *Assistant Examiner.*